United States Patent [19]
Weihrauch

[11] Patent Number: 5,823,633
[45] Date of Patent: Oct. 20, 1998

[54] PROCESS FOR THE PRODUCTION OF BRUSHWARE BY INJECTION MOULDING AND BRUSHWARE PRODUCED BY IT

[75] Inventor: Georg Weihrauch, Wald-Michelbach, Germany

[73] Assignee: Coronet-Werk GmbH, Wald-Michelbach, Germany

[21] Appl. No.: 702,613

[22] PCT Filed: Apr. 14, 1995

[86] PCT No.: PCT/EP95/01408

§ 371 Date: Aug. 30, 1996

§ 102(e) Date: Aug. 30, 1996

[87] PCT Pub. No.: WO95/30350

PCT Pub. Date: Nov. 16, 1995

[30] Foreign Application Priority Data

May 5, 1994 [DE] Germany .......................... 44 15 886.6

[51] Int. Cl.⁶ ........................................................ A46B 3/04
[52] U.S. Cl. .................................. 300/21; 15/191.1; 300/8
[58] Field of Search ........................ 15/186, 187, 191.1, 15/192, 193; 300/21, 8

[56] References Cited

U.S. PATENT DOCUMENTS

| 4,635,313 | 1/1987 | Fassler et al. | 300/21 |
| 4,892,698 | 1/1990 | Weirauch | 300/21 |
| 5,458,400 | 10/1995 | Meyer | 300/21 |

FOREIGN PATENT DOCUMENTS

| 463217 | 1/1992 | European Pat. Off. | 300/21 |
| 1462272 | 11/1966 | France | 300/21 |

*Primary Examiner*—Terrence Till
*Attorney, Agent, or Firm*—Antonelli, Terry, Stout & Kraus, LLP

[57] ABSTRACT

The invention is a process for the production of brushware having a plastic bristle carrier and at least one bristle bundle fixed to the carrier and constituted of stretched, stabilized plastic monofilaments. An open injection mould is provided defining a cavity in which the bristle carrier is moulded with one part of the mould having a channel in which at least one bristle bundle is guided with an end of each bristle bundle projecting beyond a mouth of the channel and being melted to a thickening having a cross section greater than a cross section of the channel and the bundle which anchors the bundle to the carrier with the thickening being spaced a distance from the mouth of the channel. The injection mould is closed to define the cavity and a plastic melt is injected into the cavity with the distance of the thickening of the at least one bristle bundle from the mouth of the channel permitting air and any degassing products from the plastic melt to be removed through the channel and being of sufficient length so that a length of thermally weakened monofilaments produced by a molecular reorientation during melting of the end of the at least one bristle bundle to form the thickening area surrounded by the plastic melt without the plastic melt penetrating the channel. The at least one bundle is positioned and fixed in the channel so that the distance, depending upon a diameter of the monofilaments, is between 0.1 mm and 2.O mm.

15 Claims, 4 Drawing Sheets

PROCESS FOR THE PRODUCTION OF BRUSHWARE BY INJECTION MOULDING AND BRUSHWARE PRODUCED BY IT

BACKGROUND OF THE INVENTION

1. Field of the Invention

The present invention relates to a process for manufacturing brushware and brushware.

2. Description of Prior Art

Ever since the first use of plastics both for the bristles and also the bristle carriers of brushware, numerous attempts have been made to replace the previous mechanical fixing of the bristle bundles to the bristle carrier by a positive or integral connection without any further mechanical fixing means. These more particularly include injecting in, in which the bundle ends are embedded by injecting round with the plastic melt for the bristle carrier and are fixed to the latter.

An essential quality feature of brushware is the extraction resistance of the individual bristles or bundles, i.e. the bristles must be so embedded in the plastic mass of the bristle carrier that they are not detached under the forces occurring during use. Among the known injection moulding processes only those have proved usable in which there is a thickening on the bundle ends located in the mould and which after injecting with the plastic mass of the bristle carrier forms a type of anchor and also interconnects the bristles at their fixing-side end, so that the extraction forces acting on the bundle or only on certain individual bristles are introduced into the thickening and absorbed by the fixing thereof in the bristle carrier.

The known processes use all injection moulds in which one mould half is provided with a number of channels corresponding to the bristle coverage and through which the bristle bundles can be supplied to such an extent that the ends of the bundles project into the mould cavity. The bristle ends of the bundle are then either interconnected by an adhesive forming a thickening (FR-A-1,453,829/Piotrowski) or, to the extent that they are formed from plastic monofilaments, are melted, the melt solidifying to a thickening having a larger cross-section than the bundle (DE 845,933/Schiffer).

It is obvious that the extraction resistance of the bristles increases the greater the embedding length of the bundle in the bristle carrier. However, this is countered by the following requirements. Both in the case of bristles, which are generally made from higher-grade plastics such as polyamides and for the bristle carrier the amount of material used must be kept as low as possible, which is to be implemented by a correspondingly short fixing or clamping of the bristles. Brushware also exists where the bristle carrier, for use reasons, must have a minimum wall thickness. This e.g. applies in the case of toothbrushes, so that due to the constricted conditions in the mouth a short construction, including the bristle length, is ensured.

In one known process (EP 142,885/Anchor) the bristle fixing length is minimized in that the thickenings obtained by the melting of the bristle ends as a result of the injection pressure during the injection of the plastic melt of the bristle carrier are displaced to the opening of the channel carrying the bundle, so that the fixing length is reduced to the thickness of the thickening and the anchoring of the bundle is exclusively achieved by the plastic mass of the bristle carrier penetrating into the narrow gap between the thickening and the mould wall. The further aim of this known process is to seal the channel by means of the thickening to prevent the injected plastic melt from passing out at the edge of the bundle or between the bristles (overspraying) and giving rise to burrs on the finished brush or at least to an unattractive appearance. This would also influence in an irregular manner the bending behavior of the bristles in the attachment area to the bristle carrier. However, this process is unsatisfactory for several reasons. Firstly the pressing of the thickening on the bundle channel is not certain and cannot be guaranteed in a reproducible manner. Thus, as a function of the guidance of the injection moulding material within the mould and as a function of the cross-section of the thickening, particularly its projecting length over the bundle diameter, the thickening can also float within the melt, i.e. partly draws the bundle out of the channel and into the melt, so that neither the sealing effect, nor a uniform use length outside the bristle carrier can be obtained. The extraction resistance of the bundle is also unsatisfactory, because the thin material web engaging over the thickening only has a moderate shear strength.

The disadvantages of the process are at least partly removed by another known process (EP 326,634/Coronet), in that, following the formation of the thickening, a tensile force is applied to the bundle for sealing the thickening against the channel opening. This leads to the shortest possible embedding length, which is the same for all the bundles and the so-called overspraying does not occur (penetration of plastic mass into the channel both between the bundles and also on the outer bundle circumference). However, the moderate shear strength at the fixing point of the thickening remains.

In another known process (DE 1,050,304/Beck) overspraying is to be avoided in that all the bristles of the coverage of brushware are combined into a single package and a plate is shaped onto the fastening-side end and only the border thereof is engaged behind by the plastic mass of the bristle carrier. This construction can prove advantageous for paintbrushes, artists' brushes, etc., where the action of a plurality of small bundles is not vital. Thus, this process is restricted to special brushware. However, here again the cross-section available for anchoring purposes is very small, so that its shear strength is unable to satisfy normal stresses and loads.

In the known processes which per se give rise to the best results (EP 142,885 and EP 326,634), it has been found that, apart from the aforementioned disadvantages, brushware and in particular toothbrushes produced according thereto suffer from other, unexpected quality deficiencies. Thus, at the latest after a certain period of use there is an expansion of the bundles and a significant deterioration of the recovery of the bristles, i.e. the bending strength of the individual bristles is clearly reduced in these processes, which does not occur with a greater embedding length. In that case (DE 845,993, FR 1,453,829), apart from the disadvantageously high material use, there are also other disadvantageous effects. For example, occasionally following mould removal it is found that the bundles are not parallel to one another or at right angles to the fastening-side surface of the bristle carrier and have instead tilted with respect to their desired position or there has been a distortion of the bristles in the area where they are embedded.

In the case of the greater embedding length, which is preferable for use reasons, it is necessary to prevent overspraying and the resulting burr formation. Thus, in connection with this process sealing measures have been proposed in that into the bundles located in the channel is driven a mandrel in order to tightly compress the bristles in the channel (DE 3,832,520/Schiffer). In another known process (DE 2,922,877/Zahoransky) the channel tapers towards the mould cavity and the bundles are pressed into the constriction. In addition, compressed air acts on the channel from the outside.

In all the known processes operating with additional sealing measures, even if they lead to a per se desired, greater fixing length, quality deficiencies are still encountered on the product. On the surface of the bristle carrier in the bristle bundle attachment area overspraying and unevennesses occur, particularly in the form of material peaks, cracks and cavities and the burrs and edges resulting therefrom. In section occasionally shrink-holes appear. These surface defects are particularly undesired in the case of toothbrushes due to possible damage to the mucous membranes, but also in the case of body brushes. Toothbrushes or body brushes suffering from these deficiencies do not satisfy hygienic requirements, because undesired deposits occur and in particular there is nidification and a propagation of bacteria. Finally, once again the extraction resistance is reduced.

SUMMARY OF THE INVENTION

The invention is a process for production of brushware in which a minimum amount of material is used while providing an adequate extraction resistance of bristle bundles of the brushware and also adequate individual bristles are obtained, in which the bending elasticity and recovery of the bristles are maintained and a satisfactory surface is achieved in the attachment area on the bristle carrier. Brushware satisfying these requirements is also to be provided.

The invention is based on the per se known finding that the bending strength or bending. elasticity (recovery) of the bristles obtained by stretching and thermally stabilizing the monofilaments is impaired by the melting of the bristle ends in connection with the formation of the thickening. In the immediate attachment area of the bristles to the thickening there is a molecular reorientation and consequently in this area a deterioration of the bending behavior of the individual bristles, as well as to a decrease in the tensile strength occurs. The deterioration of the bending behavior in the case of the known processes with sealing of the thickening on the channel leads to the expansion of the bundles. As a result of the process according to the invention, with the minimum possible material use for the bristles and bristle carrier the thermally weakened area of the bristles is embedded, so that over their free length outside the bristle carrier the bristles fully maintain the characteristics resulting from the stretching and thermal stabilization. The extraction resistance of the individual bristles is also improved, because the weakened area is fixed.

The length which is thermally damaged during the melting of the bundle is dependent on several factors, particularly the melting point and the duration of the heating action, the nature of the plastic and the monofilament diameter. It is easily possible to establish the damaged length on a single bundle in a preliminary test by melting the bundle end and also a few alternating bending loads or stresses, so that the necessary embedding length for the injection moulding process for the product to be produced can be established.

The knowledge of the thermal damage to the bristles, even if in a different context, namely the welding of bristles and bristle carriers, is known (DE 9,206,990 U1/Bickel). Account is taken thereof by a complicated construction of the brush, in that the brush body is provided with a depression on the bristle side. The bristles are welded onto a thin plastic plate, which is placed in the depression and covered by a perforated plate threaded over the bundles. The bundles are supposed to be laterally supported in the holes of the plate. Finally separate parts are required for bracing the perforated plate and the bundle plate with the brush body. Such a brush cannot be manufactured at an acceptable cost level and due to the edges and gaps fails to satisfy the physiological and hygienic requirements made in connection with toothbrushes or body brushes. It can also not solve the problem of the extraction strength of the individual bristles.

In the process according to the invention the thermally damaged area is embedded exclusively by surrounding with the plastic of the bristle carrier. The embedding length of the bundles is determined by the distance between the thickening and the mouth of the channel. However, according to the invention this distance must satisfy a further condition. Thus, it must at least be sufficiently large for the air displaced during the injection moulding process in the mould cavity and which preferably migrates into depressions, cracks, etc. and therefore also behind the thickening on the bristle bundle, to be able to escape through the channel and optionally also between the bristles, because it is probably responsible for the cavities, shrink-holes, etc. on the bundle attachment point observed in the known processes. The same applies regarding any degassing products of the melt ("Kunststoff-Lexikon", 6th edition, Carl Hanser Verlag). Thus, the process of the invention also removes these disadvantages. However, the distance between the thickening and the channel mouth must not be so large that overspraying occurs. The invention fixes the essential parameters for the dimensioning of the smallest possible distance, namely embedding the thermally weakened length area of the bristles ensuring a completely satisfactory venting of the mould in the vicinity of the embedding in order to avoid cavities, shrink-holes, etc. and obtaining a smooth surface on the bristle carrier to avoid overspraying. The invention has in particular recognized that the sealing of the bundle channels which has been required of late in injection technology is not necessary.

Practical tests have revealed that in the case of standard brushware, the parameters prescribed by the invention are obtained if the bundle is so positioned and fixed in the channel that the distance between the thickening and the channel mouth is 2 to 5 times the bristle diameter. This can be numerically defined in such a way that the distance in the case of bristle diameters up to 0.3 mm is between 0.1 and 1.0 mm, preferably up to 0.4 mm and in the case of larger diameters between 0.5 to 2.0 mm is preferably set up to 1.5 mm.

In order to on the one hand ensure the venting of the mould and on the other to avoid overspraying, according to an embodiment use is made of bundles, in which the sum of the cross-sections of the bristles of a bundle is between 50 and 75% of the cross-section of the channel carrying the bundle.

In this construction the capillaries between the bristles on the one hand and between the latter and the channel wall on the other are sufficiently large to permit a completely satisfactory venting of the mould, particularly in the vicinity of the undercuts present on the thickenings, but is also narrow enough to prevent the plastic melt, which must be solidified as rapidly as possible in the vicinity of the bundle attachment by suitable technological measures (guiding and controlling the and controlling the cooling of the mould, material selection in the vicinity of the bundle channels, guiding the injection speed and pressure, etc.) from penetrating the bristle capillaries or the channel.

The parameters to be respected according to the invention can be fixed by another practicable quantity, in that the bundle in the channel is so positioned and fixed that the distance between the thickening and the channel mouth is 20 to 50% of the channel diameter and the channel filling level given in the previously mentioned embodiment must also be implemented.

In the practical performance of the process the procedure is preferably such that the bundle is introduced into the channel to such an extent that its end has a distance "A" from the channel mouth, is then melted by a length "L"<"A", so that the thickening has a distance "B" from the channel mouth and that the bundle is subsequently drawn back into the channel until the thickening reaches the desired distance "C"<"B" from the channel mouth.

Using this procedure the desired, smallest possible distance can be set in a particularly simple and accurate manner. It is fundamentally possible to provide the channels carrying or guiding the bundles directly in one mould half of the injection mould and to form the thickening on the bundle end with the mould opened. However, it is preferable for the bundle to be melted and positioned to the thickening in a holder having the channel and located outside the mould at the end thereof and subsequently the holder with the positioned bundle is sealingly connected to the injection mould, whilst supplementing the one mould half. This procedure has the advantage that the preparatory work on the bundle does not take place on the injection mould which becomes heated in permanent operation, but instead outside the same. This avoids damage to the bristles by the heat emission of the injection mould and ensures a rapid solidification of the plastic melt at the bundle end and in the vicinity of the holder, thereby preventing overspraying.

This process can be optimized in that the holder on its transporting path from and to the injection mould and optionally the bundle following the formation of the thickening are cooled, so that the bundle and holder are always kept at a constant, low and controllable temperature and can be supplied in this state to the injection mould.

The problem solved by the invention in the aforementioned process can also be solved in that following the melting of the bundle end the formed still soft-plastic mass is shaped in the direction of the bristles in such a way that displacement thereof occurs between the mass and along the bundle circumference and surrounds the bristles over at least part of their length area thermally weakened by molecular reorientation during the melting of the monofilaments.

In this process at least one part of the weakened length area of the bristles is directly embedded and stabilized by the bristle material by shaping the still soft plastic thickening. As a result the overall bedding length of bundle and thickening can be further reduced.

This process can also be modified in such a way that the bundle is introduced into the channel to such an extent that after the formation and shaping of the thickening, the latter has such a distance from the channel mouth, that the length area of the monofilaments weakened by molecular reorientation during monofilament melting is partly surrounded by the mass displaced from the melted monofilaments during the shaping of the thickening and in part by the injected plastic melt of the bristle carrier, without the plastic melt penetrating the channel.

The partial length of the bristles not surrounded by the displaced material of the thickening need only be dimensioned in such a way in this process that the desired venting through the channel takes place in the vicinity of the bundle and overspraying is avoided.

The completely satisfactory venting of the mould cavity, particularly in the vicinity of the bundle attachments, as well as the prevention of overspraying are, in a further embodiment, assisted in that the injection speed decreases from a maximum value at the start of injection to the complete filling of the injection mould and that the normally applied subsequent pressure is raised from an initially low value to a higher value.

The measure provided in another variant acts in the same way in that the mould half having the channel has in the vicinity of the channel mouth a contour concentric thereto and which in the area between the thickening and the channel mouth through a lengthening of the plastic melt flow path brings about a reduction of its flow rate and speeds up the cooling of the plastic melt in this area.

A lengthening of the flow path in the vicinity of the bundle can be constructively brought about in that the contour is formed by a collar lengthening the channel into the mould cavity, or in that the contour is formed by a depression in the mould wall and the channel mouth is located on the bottom of the depression.

By means of the procedure according to the invention not only is it possible to produce top quality products, particularly toothbrushes, with minimum wastage, but also it is possible to use injection moulding, which leads to top quality brushes with respect to the general surface characteristics of the handle. Thus, e.g. a toothbrush can be moulded in the vicinity of the handle end, which normally requires a high injection pressure in order to completely fill the mould cavity. This high injection pressure in turn leads to a corresponding pressure build-up in the air contained in the cavity, which is completely satisfactorily removed by the setting of the distance between the thickening and the edge of the channel mouth according to the invention. In particular it is possible to avoid other venting measures, either via the separating surface of the injection mould, or additional venting ducts, i.e. the mould can be so tightly sealed that no burrs form in the separating surface and there are also no additional moulding points on the bristle carrier surface.

In the case of brushware, the set problem is solved in that the thickening has a distance from the bundleside bristle carrier surface which roughly corresponds to the length area of the bristles thermally weakened during the melting of the monofilaments.

BRIEF DESCRIPTION OF THE DRAWING

The invention is described in greater detail hereinafter relative to embodiments of the process of the invention by means of the attached drawings, wherein show.

DESCRIPTION OF THE PREFERRED EMBODIMENTS

FIGS. 1a to 3a show two spaced perforated plates 1 and 2 of a bundle cassette between which is located a clamping plate 4 displaceable in accordance with the direction arrow 3. The perforation pattern of the perforated plates 1 and 2 and the clamping plate 4 corresponds to the bundle arrangement of the bristle coverage to be produced.

Figure 2A:
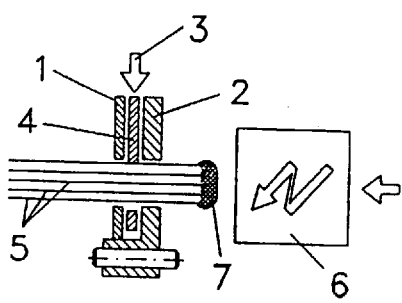
Figure 2B:
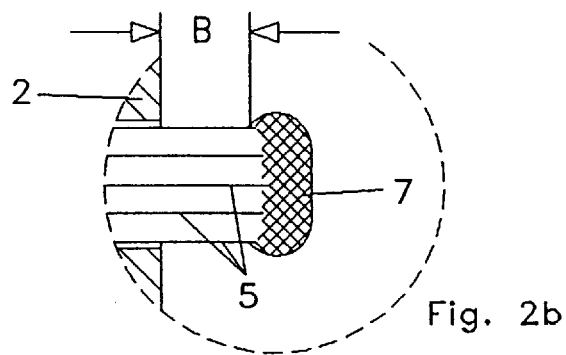

With the clamping plate 4 open, the bristles 5 in the form of a bundle and namely as short cuts or taken from the endless strand, are introduced into the holes of the guide plate 1,2 and the clamping plate 4 until the end of the bristle project past plate 4 by a certain amount. A heating device 6 FIG. 2A is then moved in front of the projecting bundle end and heats the bristle ends in contactless manner and melts the same, so that a thickening forms (FIG. 2a). The clamping plate 4 is then moved into the open position (FIG. 3a) and the bundle is positioned by a slider 8 acting on the thickening 7 and then the clamping plate is moved into the closed position (not illustrated).

Figure 1A:
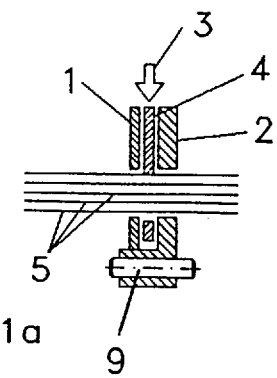
FIGS. 1–3 show the production of the thickening with an indication of the apparatus required in FIGS. 1a, 2a and 3a and a larger-scale view of the working area in FIGS. 1b, 2b and 3b.
Figure 1B:
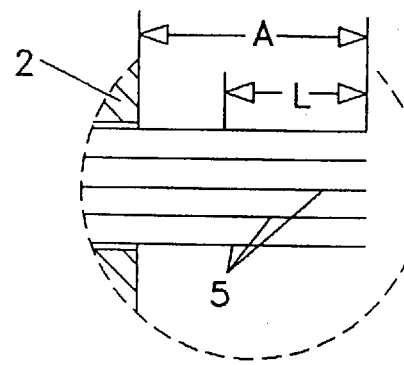
Figure 3A:
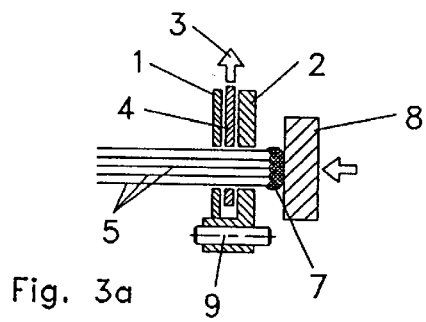
Figure 3B:
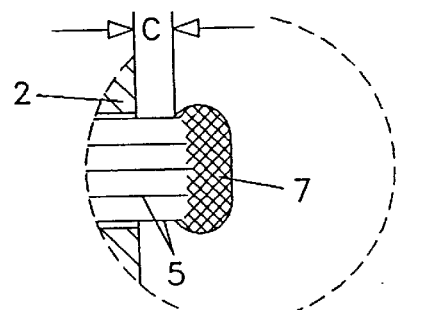
Figure 4:
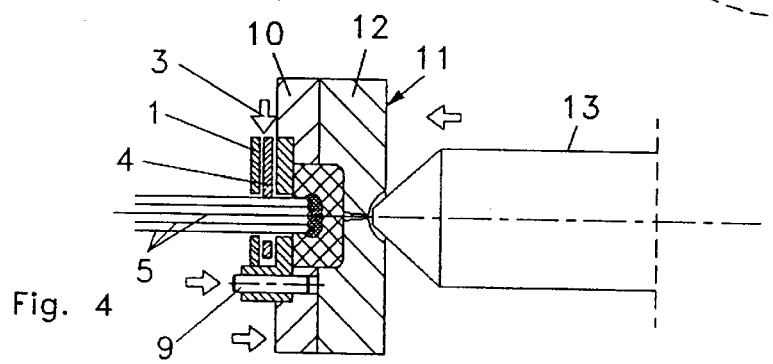
FIG. 4 is a diagrammatic view of an injection mould during injection.
Figure 5:
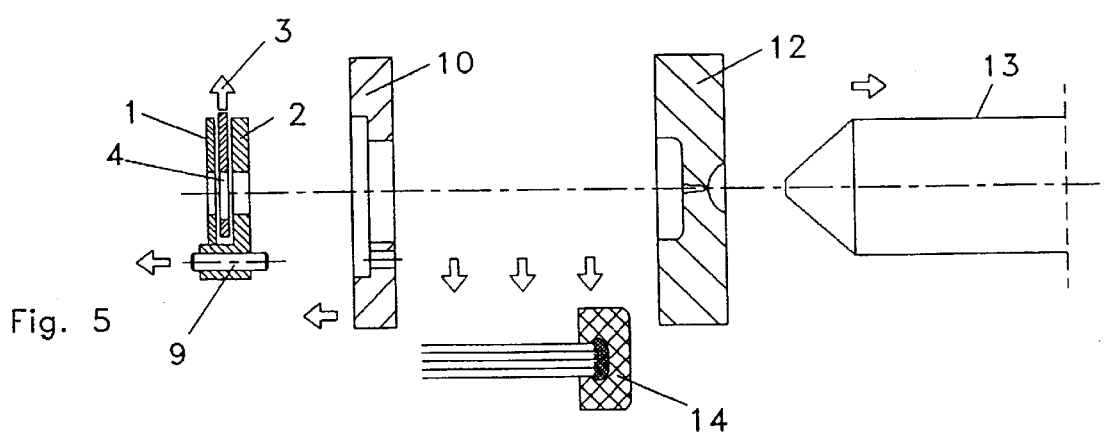
FIG. 5 is a diagrammatic view during the mould removal of the brush.

In the larger-scale view of FIG. 1b it can be seen that during the supply of the bundle the bristles 5 project past the perforated plate 2 by the amount "A". On melting, the bristle ends according to FIG. 2a are melted over the length "L" (FIG. 1b), so that the thickening 7 which forms has a minimum distance "B" from the perforated plate 2. By means of the slider 8 (FIG. 3a) the thickening 7 is then moved in the direction of the perforated plate 2 until it has the desired distance "C" from the surface thereof (FIG. 3b).

The thus fixed bundle is then linked to one mould half 10 of an injection mould 11 by means of the cassette formed by the perforated plates 1,2 and the clamping plate 4 and using a centering/alignment tool 9, the cassette terminating the moulding nest of the mould half 10. After closing the mould through the second mould half 12 by means of the extrusion or injection head 13 the plastic melt is injected for the bristle carrier and it flows around the bundle ends projecting into the mould cavity, i.e. the thickening 7 and the bristles over the length "C" (FIG. 3b). The displaced air escapes through the holes of the perforated plate 2 forming the bundle channel and the bristles 5 are surrounded over the length "C" by the plastic melt, without the latter penetrating the bundle channel of the perforated plate 2. When the bristle carrier or the brush handle has adequately cooled, the cassette comprising the perforated plates 1,2 and the clamping plate 4 is moved away, the mould half 10 is raised and the finished brush 14 is ejected.

Figure 6A:
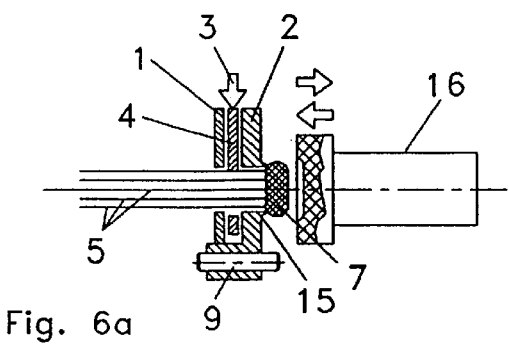
FIGS. 6 and 7 show another variant of the process for producing the thickening with the necessary apparatus parts in FIGS. 6a and 7a and a larger-scale view of the working area in FIGS. 6b and 7b.
Figure 6B:
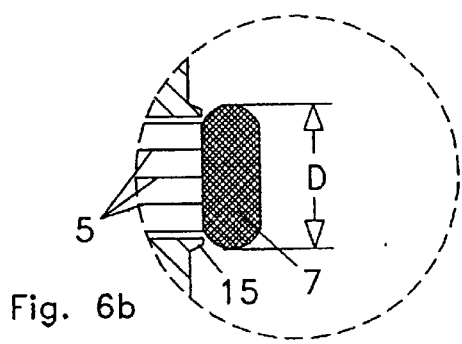
Figure 7A:
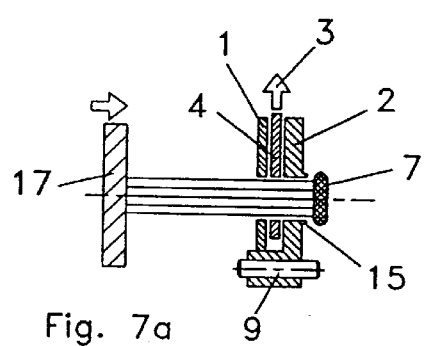
Figure 7B:
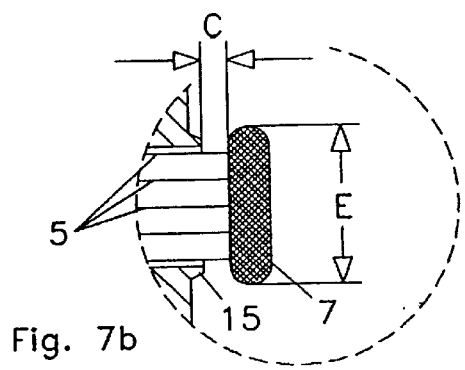
Figure 8:
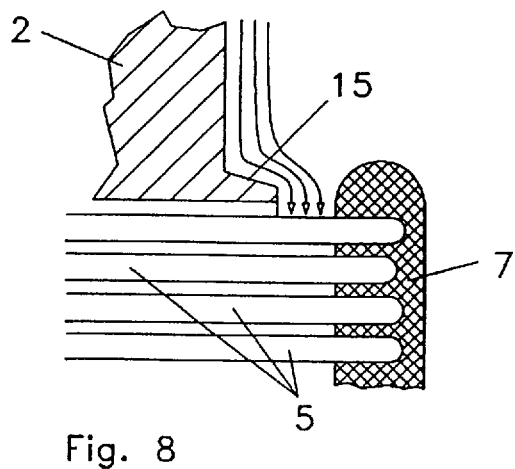
FIGS. 8 to 10 show other variants of the process in a diagrammatic representation.
Figure 9:
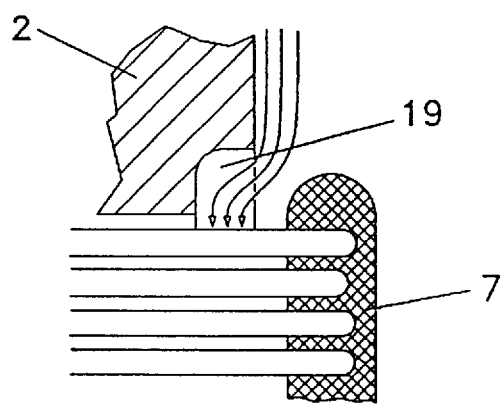
Figure 10:
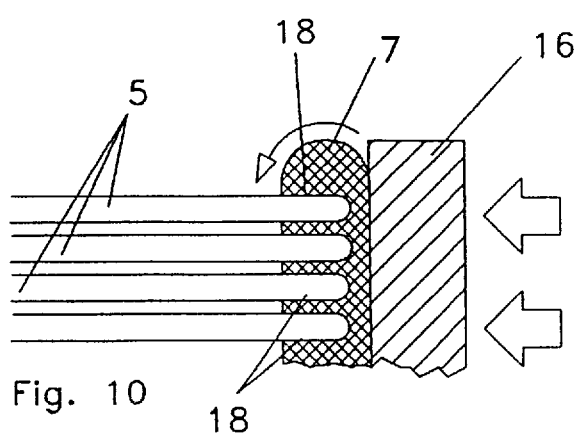

In the embodiment according to FIG. 6a the perforated plate 2 has a concentric collar 15 projecting into the mould frame. The bristles 5 are introduced into the perforated plates 1,2 and clamping plate 4 in the open position thereof, in the same way as described relative to FIG. 1a. The bristle ends projecting over the perforated plate 2 are melted by means of a combined heating and shaping device 16 and the melt is shaped at the collar 15, so that once again a thickening 7 is formed, whose diameter "D" after melting is initially slightly larger than the bundle diameter (FIG. 6b) and is increased to the diameter "E" by shaping. After shaping the bristles 3 or the bundle formed by them are moved in the direction of the mould cavity by means of the slider 17, with the clamping plate 3 open, until the thickening 7 has the distance "C" (cf. FIG. 3b) from the collar 15 of the perforated plate 2 (FIG. 7b). The shaping of the still soft plastic melt of the thickening 7 can also take place in such a way that the soft plastic material between the bristles weakened by the heat treatment and on the outer circumference of the bundle is displaced in the direction of the bristles, as shown in FIGS. 8 to 10. As a result at least part of the thermally weakened length of the bristles 5 is embedded by the bristle material, as can be seen in areas 18 in FIG. 10.

In order to prevent overspraying and bring about in the vicinity of the bundle attachment a faster cooling of the bristle carrier plastic melt, the mould half or the perforated plate 2 has in the vicinity of the bundle channel a flow path-lengthening, concentric contour, e.g. the collar 15 (FIG. 8) or a corresponding depression 19, at whose bottom then issues the bundle channel.

The invention claimed is:

1. A process for the production of brushware having a plastic bristle carrier and at least one bristle bundle fixed to the carrier and constituted of stretched, stabilized plastic monofilaments comprising:
    providing an open injection mould defining a cavity in which the bristle carrier is moulded with one part of the mould having a channel in which at least one bristle bundle is guided with an end of each bristle bundle projecting beyond a mouth of the channel and being melted to a thickening having a cross section greater than a cross section of the channel and the bundle which anchors the bundle to the carrier with the thickening being spaced a distance from the mouth of the channel; and
    closing the injection mould to define the cavity and injecting a plastic melt into the cavity with the distance of the thickening of the at least one bristle bundle from the mouth of the channel permitting air and any degassing products from the plastic melt to be removed through the channel and being of sufficient length so that a length of thermally weakened monofilaments produced by a molecular reorientation during melting of the end of the at least one bristle bundle to form the thickening are surrounded by the plastic melt without the plastic melt penetrating the channel and wherein the at least one bundle is positioned and fixed in the channel so that the distance, depending upon a diameter of the monofilaments, is between 0.1 mm and 2.0 mm.

2. A process according to claim 1, wherein the at least one bundle is so positioned and fixed in the channel so that the distance from the thickening to the mouth of the channel is 2 to 5 times a diameter of the bristles.

3. A process according to claim 1, wherein the distance from the thickening to the mouth of the channel for bristles having diameters up to 0.3 mm is between 0.1 mm and 1.0 mm, and for bristles having diameters larger than 0.3 mm the distance from the thickening to the mouth of the channel is from 0.5 mm to 2.0 mm.

4. A process in accordance with claim 3, wherein for diameters of up to 0.3 mm the distance from the thickening to the mouth of the channel is from 0.1 mm to 0.4 mm and for diameters larger than 0.3 mm the distance from the thickening to the mouth of the channel is from 0.5 mm to 1.5 mm.

5. A process according to claim 1, wherein the at least one bundle is positioned and fixed in the channel so that the distance from the thickening to the mouth of the channel is in a range from 20% to 50% of a diameter of the channel.

6. A process according to claim 1, wherein a sum of a, cross-section of the bristles of one bundle of the at least one bundle is from 60% to 75% of a cross-section of the channel.

7. A process according to claim 1, wherein the at least one bundle is inserted into the channel so that the end thereof has a distance A from the mouth of the channel, is then melted to a length L with L<A, so that the thickening has a distance B from the mouth of the channel and the bundle is then drawn back into the channel until the thickening has the distance C from the mouth of the channel with C<B.

8. A process according to claim 1, wherein the bundle is melted at the end thereof to form the thickening and is positioned outside the injection mould in a holder containing the channel and then the holder holding the positioned bundle in association with one part of the mould is sealingly connected to the injection mould.

9. A process according to claim 8, wherein the holder and the bundle have a transporting path and the bundle held in the holder following formation of the thickening during motion along the transporting path undergoes cooling.

10. A process according to claim 1, wherein after melting the end of the at least one bundle, the soft plastic material of the at least one bundle is shaped in the direction of the bristles and is displaced between the bristles and along a bundle circumference and surrounds the bristles over at least part of a length thereof which is thermally weakened by molecular reorientation during melting of the monofilaments.

11. A process according to claim 10, wherein the bundle is introduced into the channel to such an extent that following formation and shaping of the thickening the bundle is spaced a distance from the mouth of the channel that a length of the monofilaments weakened by the molecular reorientation during melting of the ends of monofilaments is partly surrounded by material displaced from the melted monofilaments during shaping of the thickening and partly by the injected plastic melt of the bristle carrier without the plastic melt penetrating the channel.

12. A process according to claim 1, wherein a speed of injection is reduced from a maximum value at a start of injection to a time of complete filling of the injection mould and a pressure applied subsequently to the complete filling of the mould is raised from an initially lower value to a higher value.

13. A process according to claim 1, wherein a mould part having the channel in a vicinity of the mouth thereof has a concentric contour and in a location between the thickening and the channel mouth a lengthening of the flow path of the plastic melt reduces a flow rate and a cooling of the plastic melt is speeded up in the location between the thickening and the channel mouth.

14. A process according to claim 13, wherein the contour is formed by a collar extending the channel into the cavity of the mould.

15. A process according to claim 13, wherein the contour is formed by a depression in a wall of the mould and the mouth of the channel is located on a bottom of the depression.

* * * * *